United States Patent [19]

Niklaus et al.

[11] 4,250,765
[45] Feb. 17, 1981

[54] FORCE TRANSMITTING ARRANGEMENT

[75] Inventors: Bernd Niklaus, Rastatt; Manfred Braun, Bühlertal; Roland Maier, Baden-Baden, all of Fed. Rep. of Germany

[73] Assignee: Robert Bosch GmbH, Stuttgart, Fed. Rep. of Germany

[21] Appl. No.: 4,019

[22] Filed: Jan. 17, 1979

[30] Foreign Application Priority Data

Feb. 15, 1978 [DE] Fed. Rep. of Germany ....... 2806307

[51] Int. Cl.³ .............................................. F16H 35/00
[52] U.S. Cl. .............................................. 74/388 PS
[58] Field of Search ....................... 74/388 R, 388 PS; 192/12 BA, 17 D, 26, 41 S, 56 C

[56] References Cited

U.S. PATENT DOCUMENTS

| | | | |
|---|---|---|---|
| 2,569,585 | 10/1951 | Small | 74/388 R |
| 2,756,605 | 7/1956 | Lincoln et al. | 74/388 PS |
| 2,939,329 | 6/1960 | Doerries | 74/388 R |
| 2,979,925 | 4/1961 | Hungerford | 192/41 S |
| 3,008,558 | 11/1961 | Bennett et al. | 74/388 R |
| 3,214,988 | 11/1965 | Bodge | 74/388 R |
| 4,109,529 | 8/1978 | Niklaus | 74/388 R |

FOREIGN PATENT DOCUMENTS 2247135 3/1974 Fed. Rep. of Germany ....... 74/388 PS

Primary Examiner—Lawrence J. Staab
Attorney, Agent, or Firm—Michael J. Striker

[57] ABSTRACT

A force transmitting arrangement, useable as force amplifier of drive arrangements, transmits the moment of a reversible electric motor, acting as a servo motor or as a drive motor, over a friction core and a looped spring cooperating therewith to an output shaft. The looped spring has a pair of outwardly bent ends, which at the outer sides thereof drive, while taking up a tension force, an output entrainment member connected to the output shaft, whereas an input entrainment member connected with a manually operated drive, for instance the steering wheel of a motor vehicle, is located between the outwardly bent ends of the looped spring.

16 Claims, 12 Drawing Figures

4,250,765

FORCE TRANSMITTING ARRANGEMENT

BACKGROUND OF THE INVENTION

The present invention relates to a force transmitting arrangement in which coupling means, arranged between a drive shaft of a reversible electric motor and an output shaft, comprise a cylindrical friction core, a coiled spring extending about the peripheral surface of the friction core, an output entrainment means connected to the output shaft and a manually operable input entrainment means, in which the two entrainment means are movable relative to each other to couple, respectively uncouple the coiled spring.

Such force transmitting arrangements are known in the art, in which the coupling is provided with a spreadable or expandable coil spring. This known arrangement has the disadvantage that it is relatively complicated in its construction and that the spreadable spring must be ground at its engaging outer surface in order to avoid an unduly large specific surface pressure. In addition, the spreadable spring tends to stick in its fully coupled position.

SUMMARY OF THE INVENTION

It is an object of the present invention to provide a force transmitting arrangement of the aforementioned kind which avoids the disadvantages of such known force-transmitting arrangements.

It is a further object of the present invention to provide a force transmitting arrangement of the aforementioned kind which is simpler in construction than known arrangements.

It is an additional object of the present invention to provide a force transmitting arrangement which produces less noise than the force transmitting arrangements known in the art and will also stand up better during extended use.

With these and other objects in view, which will become apparent as the description proceeds, the force transmitting arrangement according to the present invention includes support means, a reversible electric motor mounted on the support means and having a drive shaft, an output shaft turnably mounted in the support means, and coupling means between the drive shaft of the motor and the output shaft and comprising a cylindrical friction core having an outer peripheral surface and being turnably mounted in the support means, looped spring means wound about the peripheral surface of the friction core, an output entrainment means and an input entrainment means movable relative to the output trainment means to couple with the spring means, and uncouple from the spring means from, the peripheral surface of the friction core, in which the input and output entrainment means are both arranged on one end face of the friction core.

In the coupling position, the spring means is subjected to a tensile stress which is more favorable than a bending stress to which the spreading spring of the known force transmitting arrangement is subjected.

A special advantage of the present invention is that the force transmitting arrangement may be used as a servo arrangement, for instance, to support the steering force acting on the steering wheel of a motor vehicle, as well as a motoric drive arrangement. This can be obtained by a minor increase of the distance between the bent over ends of the looped spring means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
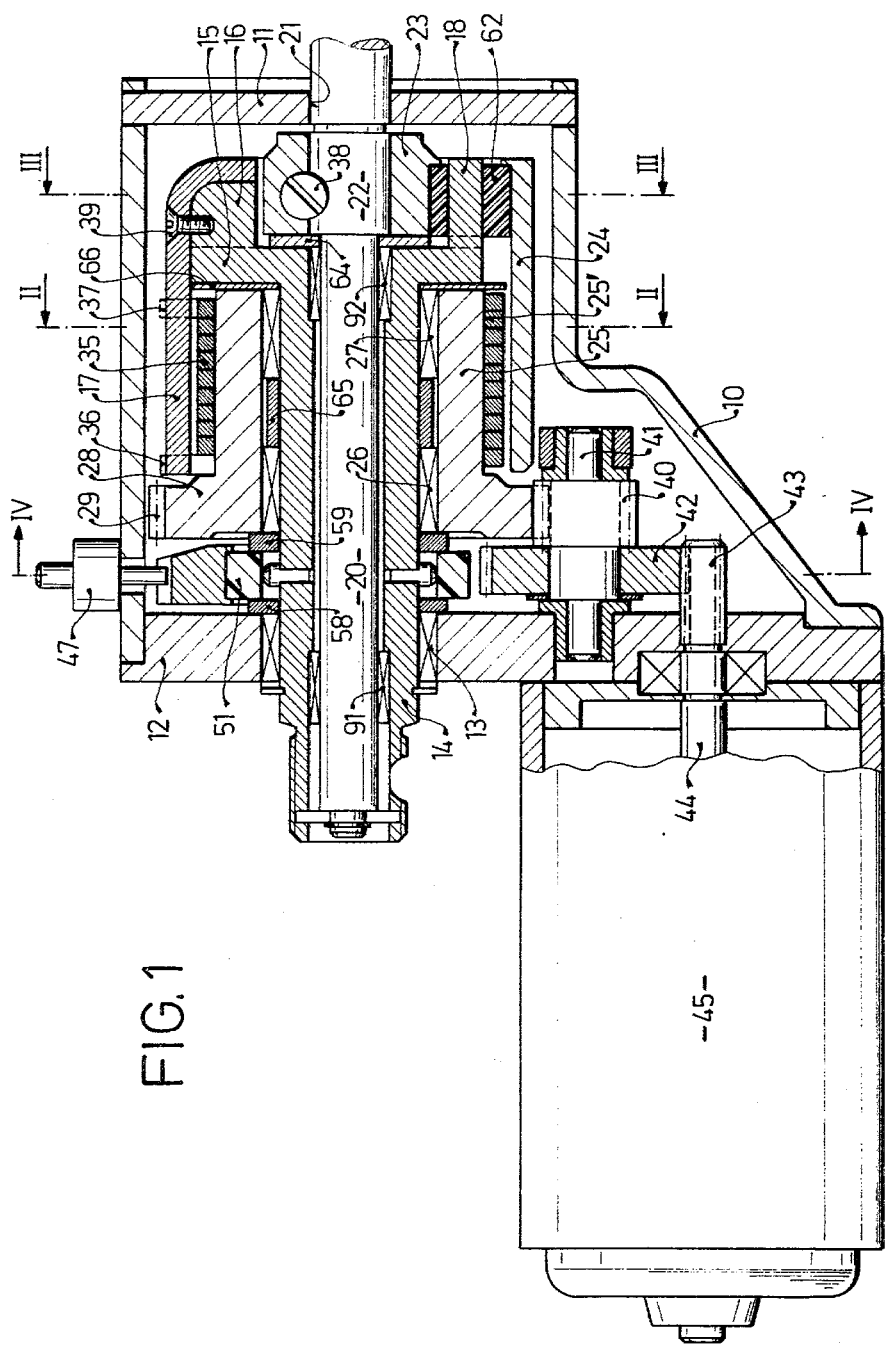
FIG. 1 is a longitudinal cross section through the force transmitting arrangement according to the present invention.

Referring now to the drawing, and more specifically to FIGS. 1–4, of the same, it will be seen that the force transmitting arrangement according to the present invention comprises a housing or support means 10 closed at opposite ends by covers 11 and 12. A hollow shaft 14 is turnably mounted in a bearing 13 arranged in an opening of the cover 12 and projects with an end portion thereof beyond the cover 12 to the outside of the housing, whereas the opposite end of the hollow shaft in the housing is provided with a radially extending flange 15. A nose 16 projects to one side of the flange 15, to which a bar-shaped input entrainment member 17 is fixedly connected, extending parallel to the axis of the hollow shaft 14 towards the cover 12. A second nose 18 projects laterally from the flange 15 diametrically opposite the nose 16.

An output shaft 20 is turnably mounted by roller bearings 91 and 92 coaxially within the hollow shaft 14 and the output shaft 20 extends outwardly of the housing through a bore 21 in the cover 11. The output shaft 20 has within the housing, adjacent to the cover 11, a collar 22 to which the hub 23 of a cup-shaped output entrainment member 24 is connected for turning with the output shaft 20. The peripheral wall of the cup-shaped output entrainment member 24 extends in direction toward the cover 12. A hollow cylindrical friction core 25 is arranged in the annular space between the inner surface of the peripheral wall of the output entrainment member 24 and the hollow shaft 14. The friction core 25 is mounted by anti-friction bearings 26, 27 preferably constucted as needle bearings, on the hollow shaft 14 for rotation with respect to the latter. A flange 28 is provided on the friction core on the end of the latter facing the cover 12, the flange 28 is provided at the outer peripheral surface thereof with a gearing 29.

The output entrainment member 24 has in its peripheral wall a longitudinally extending slot 31 (FIG. 2) having parallel extending edges 31' and 31", and the input entrainment member 17 extends into this slot. The play between the outer edges 17' and 17" of the entrainment member 17, and the edges 31' and 31" of the slot 31 is so large so as to form therebetween free spaces 32 and 33. The end of the entrainment member 17 facing the cover 12 is arranged in the same plane as the end face of the entrainment member 24.

Looped spring means 35 in form of a coiled spring having a plurality of turns are arranged on the peripheral surface 25' of the friction core 25. The spring means 35 engage surface 25' in a neutral position so that when no force is acting on the same, the spring means are positioned on the peripheral surface 25' of the friction core with a slight pretension. The coil spring 35 has at opposite ends thereof respectively outwardly extending hook-shaped end portions 36 and 37. The end portion 36 projects into the slot 32 between the edges 17' and 31' of the two entrainment members 17 and 24, whereas the other hook shaped end portion 37 projects into the slot 33 between the edges 17" and 31" of the two entrainment members. The edges 31 and 31' of the output entrainment member 24 are rounded so that they may, depending on the position of the looped spring 35 engage into the concave sides of the hook shaped end portions of the spring. The hub 23 of the entrainment member 24 is fixedly connected to the collar 22 on output shaft 20 by a screw 38 and the connection of the entrainment member 17 with the nose 16 is made by a screw 39.

The gearing 29 of the friction core 25 is in engagement with a gear 40 fixed to a shaft 41 turnably mounted in bearings provided in the housing, and in the cover 12. Another gear 42, of a larger diameter than the gear 40, is likewise mounted on the shaft 41 for rotation therewith, and the gear 42 meshes with a pinion 43 mounted on the drive shaft 44 of a reversible electromotor 45 mounted in any suitable manner, not shown in the drawing, on the cover 12. The output shaft 20 may be constructed as component of a steering arrangement of a motor vehicle.

Energizing of the electromotor 45 is performed by means of an electrical turning direction switch 47 of known construction (FIG. 4) in which a middle tongue 48 is provided which engages into a slot 49 of a switching yoke 50. The switching yoke 50 turnably engages with slight pretension a disc 51 of plastic material provided with two diametrically opposite slots 52 and 53 into which two entrainment pins 54 and 55 engage, which are respectively arranged in bores 56 and 57 in the hollow shaft 14. The disc 51 is located between two other discs 58 and 59, one of which abuts against the cover 12 and the other onto the friction core 25.

The nose 18 on the hollow shaft 14 engages into a slot 60 which is provided in the end wall 24' of the entrainment member 24 which faces the cover 11. In the middle position of the entrainment member 24, the nose 18 may be arranged with slight play between two pretensioned rubber springs 61 and 62 which are arranged in opposite lateral enlargements 60' and 60" of the slot 60.

A separating disc 64 is arranged between the hub 23 of the entrainment member 24 and the flange 15 of the hollow shaft 14 and the only function of this separating disc 64 is to reduce the friction between the hub 23 and the adjacent flange 15.

A distance sleeve 65 is arranged between the needle bearings 26 and 27. A further separating disc 66 is arranged between one end face of the friction core 25 and the adjacent flange 15 of the hollow shaft 14, which has the same function as the separating disc 64.

The above-described force transmitting arrangement may for instance be used to support a turning moment applied to the steering wheel of a motor vehicle. In such a case, the steering wheel has to be connected to the hollow shaft 14. If the steering wheel is in a middle position, that is if no steering moment is applied thereto, then the entrainment 17 is located in the middle of the slot 31 and the upwardly turned end portions 36 and 37 of the spring 35 are arranged symmetrically with respect to the vertical plane of symmetry including the axis of the hollow shaft 14. Essential is now that the distance a between the edges 17' and 17" and the convex surfaces of the spring ends 36 and 37 is smaller than the distance between the edges 31' and 31" of the entrainment member 24 and the concave regions of the spring ends 36 and 37.

If the steering wheel is now turned through a slight angle, then the middle tongue 48 of the switch 47 engages one side of the slit 49 in the switch yoke 50 so that the electromotor 45 is energized and turned in the same direction in which the steering wheel has been turned. The friction core 25 is then turned so that the convex side of one spring end engages the entrainment member 17 and this engagement takes place before the concave side engages one of the edges 31', or 32' since the distance "a" is smaller than the distance "b". Due to the engagement of the convex side of the one spring end with the entrainment member 17, the inner diameter of the coiled spring 35 is enlarged so that the rotating friction core 25 will not transmit a moment from the electromotor 45 onto the drive shaft 20. The residual moment between the interior diameter of the enlarged coil spring 35 and the friction core 25 is negligibly small.

If now, the input entrainment member 17 is turned against the force of the spring elements 61, and 62, further in the same direction as the friction core 25 is driven by the electromotor 45 until one of the spring ends 36, or 37 engages with its concave side the edge 31', or 31" respectively of the output entrainment 24, then the looped spring 35 is tightened upon the peripheral surface 25' of the friction core 25. The thus increased frictional connection permits transmission of the motor moment over the friction core 25 and the looped spring 35 onto the output entrainment member 24 and from the latter onto the output shaft 20. After turning of the steering wheel is finished, while the electromotor 45 will drive at this moment the friction core 25, one of the spring ends 36, or 37 engages with the convex side the entrainment edge 17', or 17", whereby the inner diameter of the looped spring 35 is increased so that the force transmission from the electromotor 45 to the output shaft 20 is interupted.

Figure 2:
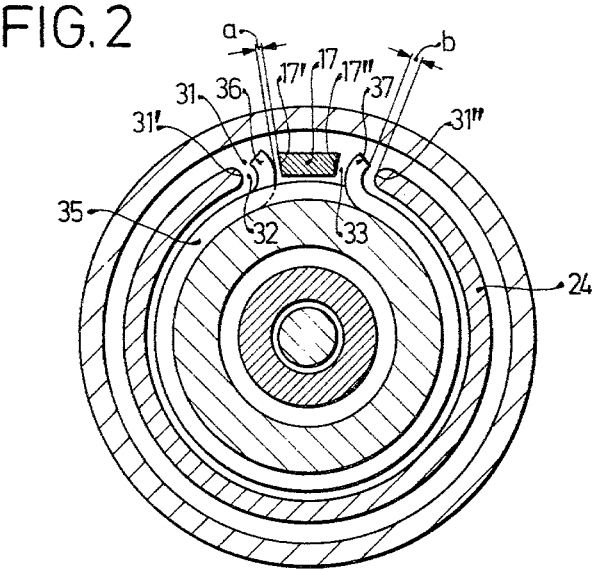
FIG. 2 is a cross section taken along the line II—II of FIG. 1.
Figure 12:
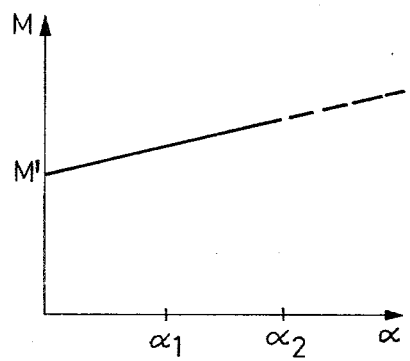
FIG. 12 is a diagram relating to the arrangement shown in FIG. 11.

In the middle position of the two entrainment members 17 and 24 with respect to each other (steering moment $M_L=0$), as illustrated in FIG. 2, the electromotor 45 is switched off by the switch 47, which is desirable since when the steering moment is zero no servo support is desired. The magnitude of the servo support depends therefore on the angular position of the entrainment members 17 and 24 with respect to each other. The two rubber springs 61 and 62, which are embedded with pretension in the end wall 24' of the output entrainment member 24, have therefore the task to return the two entrainment members 17 and 24, after the same have been turned with respect to each other, to the neutral position as shown in FIG. 2, by means of the nose 18 on the flange 15 of the hollow shaft 14. In order to accomplish this second more important task, the pretension of both rubber springs 61 and 62 is essential. FIG. 12 shows the characteristic curve $M_L=F(\alpha)$ of the two rubber spring elements 61 and 62 in dependence on the turning angle $\alpha$ and that this characteristic curve does not extend through the zero point of the diagram. The function of the rubber spring elements is only assured when the value M' is greater than the return moment of the front wheels of the vehicle during passing through a curve.

Especially important is the substantially friction-less mounting of the hollow shaft 14 so that the return force provided by the spring elements 61, and 62 is sufficient in order to overcome the frictional moment of the radial bearings 13, 26, 27, 91 and 92 and the axial bearings 58, 59, 66, and 64 of the hollow shaft 14 (at a moment transmission through the drive motor 45 of 25 Nm (Newton-meters) a radial bearing loading may be of about 1000 N). For this reason the aforementioned bearings are constructed as roller or, needle bearings or as slide bearings with extremely low friction coefficients. This requirement is especially essential by use of the arrangement as steering support for motor vehicles since during such use a shock-free transmission from the fully engaged conditions to the slipping condition of the looped spring is required.

According to a further development of the present invention, in which the arrangement is especially used as steering support, two friction cores are provided, instead of the single friction core, in which the two friction cores are simultaneously driven in both directions of rotation. Such an arrangement has the advantage that, even during immediately following changes of turning the direction on the steering wheel, the servo support of the drive motor will always be available. In the embodiment as shown in FIG. 1, the drive motor requires a relatively long time in order to carry out the reversal of the turning direction.

Whether one or two friction cores are to be used depends on the purpose of the arrangement. If the arrangement is used only as support during parking, which evidently occurs at slow speed, a system with a single friction core is sufficient. If the servo steering has to be used also at a medium speed of the motor vehicle, then the use of a system with two friction cores is advantageous.

Figure 5:
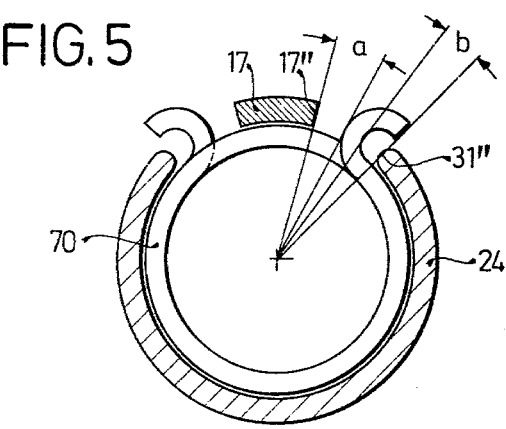
FIG. 5 is a cross section similar to that shown in FIG. 2 and showing a slightly modified arrangement in which the force transmitting arrangement is used for transmitting a motoric drive.

FIG. 5 illustrates a modification of the looped spring which differs slightly from the above described. The looped spring 70 shown in FIG. 5 differs from the looped spring 35 previously described only in that the distance "a" from the edge 17" of the entrainment member 17 to the convex side of the end of the looped spring is larger than the distance "b" from the concave side of the spring end to the edge 31" of the entrainment member 24. This modification is especially suitable for a motoric drive with possibility of manual actuation at for instance failure of the drive motor. In this case the turning movement of a motor is likewise transmitted over the friction core and the looped spring onto the output shaft 20. Since the distance "a" is greater than the distance "b" the output shaft can also be moved without turning the drive shaft of the motor, that is, manual actuation is also possible if a self-locking gear transmission is used.

If, for instance, the hollow shaft 14 is driven by a motor and therewith the input entrainment 17 is turned relative to the output entrainment member 24, then the convex portion of one of spring ends, engages the edge 17', or 17" respectively before the concave side of the spring end engages the edge 31', or 31" of the output entrainment member 24. Thereby the looped spring 70 is expanded so that, even if a self-locking gear transmission is used, it is possible to manually turn the output shaft 20. The energizing of the electromotor is carried out in this case not by the turning direction switch 47, but for instance by means of an external polarity reversal switch, or for instance, by means of a guide cable located below the road surface. This permits also to steer the vehicle without an operator. During a failure of the steering drive it is always possible to manually steer the vehicle. The looped spring serves in this case to interrupt the transmission from the motor to the output shaft and to establish the transmission from the steering wheel to the output shaft.

Figure 6:
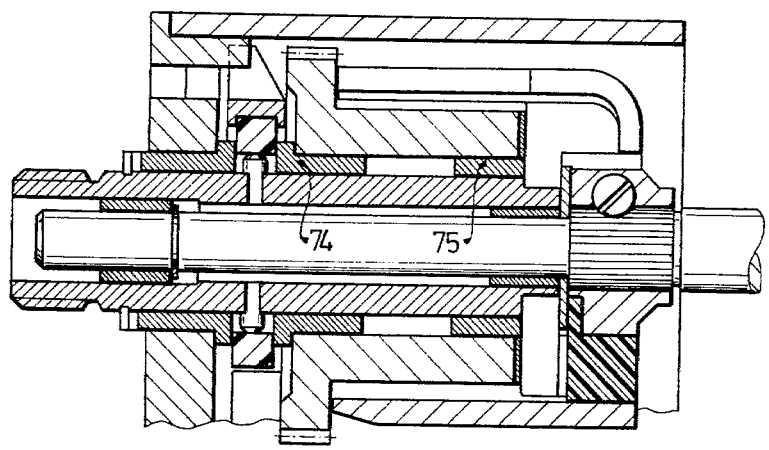
FIG. 6 is a partial longitudinal cross section similar to FIG. 1, and showing a slight modification.
Figure 7:
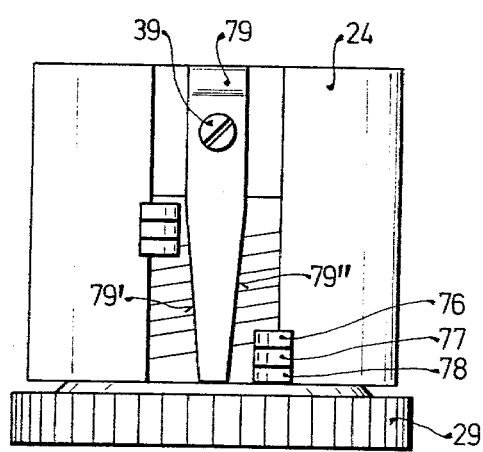
FIG. 7 shows a modification of certain elements shown in FIG. 1.
Figure 8:
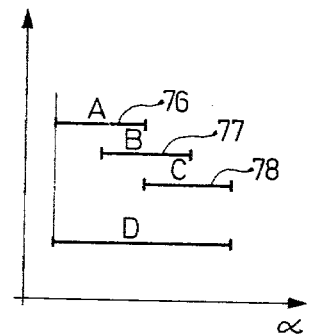
FIG. 8 is a schematic diagram relating to the arrangement shown in FIG. 7.

The embodiment shown in FIG. 6 differs from the embodiment of FIG. 1 only in that instead of roller, bearings or needle bearings 26 and 27, sleeve bearings 74 and 75 with a minimum friction coefficient are provided. It is necessary that the friction between the friction core 25 and the hollow shaft 14 is maintained as small as possible. By use of shoulder bearings to opposite sides of the plastic disc 51, the spacer discs 58 and 59 shown in FIG. 1 may be omitted. At still higher requirements as to the softness of the transition of one coupling phase into the other, it is necessary to use a plurality of looped springs, instead of a single spring. Such an embodiment is shown in FIGS. 7 and 8 in which three looped springs 76, 77 and 78 are provided and in which the entrainment member 17 shown in FIG. 1, is replaced by an entrainment member 79, which is provided with two inclined edges 79' and 79". The three looped springs are arranged parallel to each other in such a manner that the ends thereof are aligned with each other. In this construction the transition from the coupling to the slipping condition of the springs relative to the friction core occurs in several steps, that is not suddenly, since as schematically indicated in FIG. 8, one spring after the other will be moved to the coupling position.

This arrangement has also the advantage that if one of the spring ends breaks, the steering support during turning in one direction will not be interrupted, as will occur if a system with only a single looped spring is used, and the likelihood that all spring ends break at the same time is practically nil.

FIG. 8 shows the steering angles A, B and C of the three springs 76–78 and their total angle D.

Figure 9:
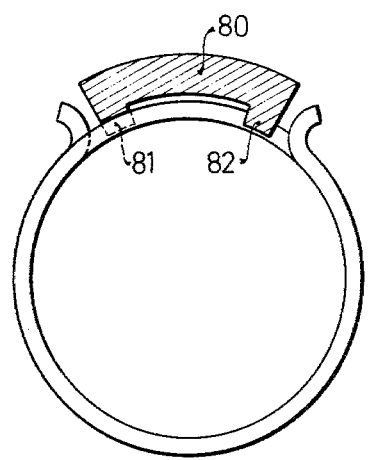
FIG. 9 illustrates in cross section a further modification of one of the elements of the force transmitting arrangement.
Figure 10:
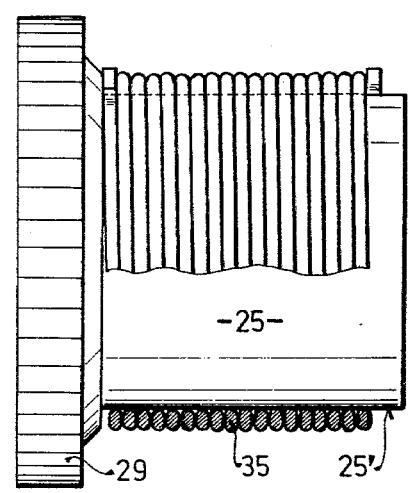
FIG. 10 is a partially sectioned view, showing a preferred construction of the looped spring means.

Especially advantageous is also if, as shown in FIG. 10, the spring 35 is wound edgewise. A further protection against failure of the arrangement upon breaking of the bent spring ends is shown in the embodiment illustrated in FIG. 9. In this embodiment the input entrainment member, designated in FIG. 9 with the reference numeral 80, has two inwardly directed beads 81 and 82 which extend nearly to the internal diameter of the looped spring. In this case, even if one of the upwardly bent ends of the looped spring should break, the manual operability is still maintained since the beads 81 or 82 cannot slide over the spring, but will abut against any adjacent surface of fracture and therewith uncouple the spring.

Figure 3:
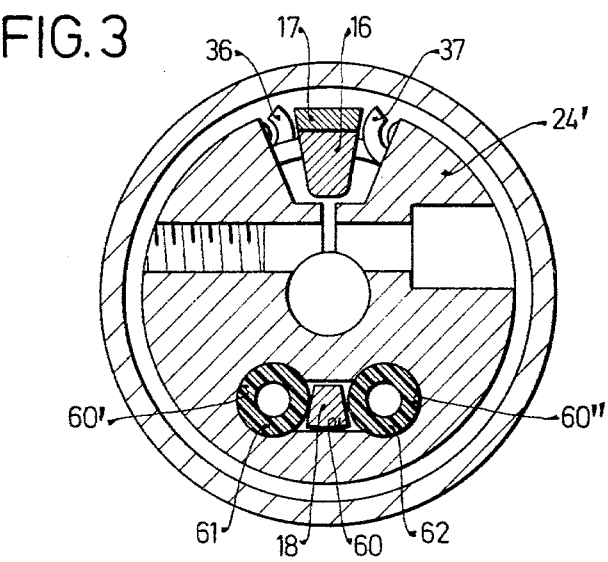
FIG. 3 is a cross section taken along the line III—III of FIG. 1.
Figure 4:
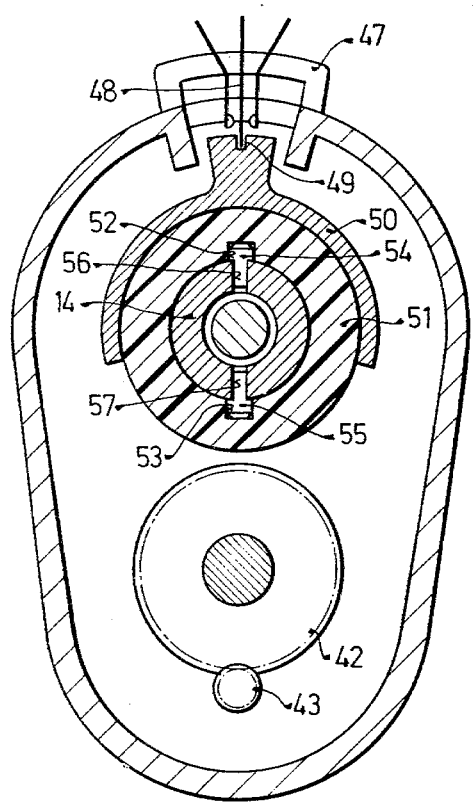
FIG. 4 is a cross section taken along the line IV—IV of FIG. 1.
Figure 11:
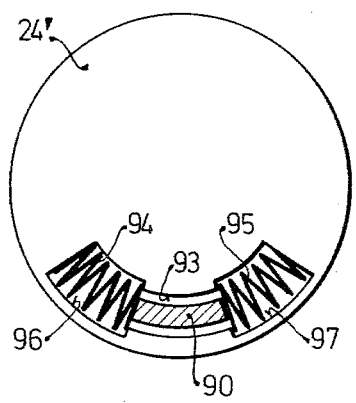
FIG. 11 is a cross section similar to FIG. 3 and showing a modified arrangement.

FIG. 11 illustrates an arrangement similar to that shown in FIG. 3. In the arrangement shown in FIG. 11, the element equivalent of the nose 18, designated in FIG. 11 with the reference numeral 90, is arranged in a transverse slot 93 in the end wall 24' of the output entrainment member 24. Two pretensioned springs 94 and 95 arranged in enlargements 96 and 97 of the slot 93, act onto opposite sides of the nose 90. The action of the springs 94 and 95 is the same as the action of the springs 61 and 62 shown in FIG. 3, and the only difference between the two embodiments is that in FIG. 3 springs made from rubber and in FIG. 11 springs made from spring steel are used.

It will be understood that each of the elements described above, or two or more together, may also find a useful application in other types of force transmission arrangements differing from the types described above.

While the invention has been illustrated and described as embodied in a force transmitting arrangement including a friction core and a looped spring wound about the peripheral surface of the friction to render the force transmitting arrangement active during tight engagement of the looped spring with the peripheral outer surface of the friction core and inactive during expansion of the looped spring.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a force transmitting arrangement, a combination comprising support means; a reversible electric motor mounted on said support means and having a drive shaft; said support means including a hollow shaft; an output shaft turnably mounted in said support means; and coupling means between said drive shaft of said motor and said output shaft; said coupling means comprising a cylindrical friction core having an outer peripheral surface and being turnably mounted in said support means, looped spring means wound about said peripheral surface, output entrainment means and input entrainment means movable relative to said output entrainment means to couple or uncouple said spring means with said peripheral surface, said input entrainment means including an arm extending over said looped means and being fixedly connected to said hollow shaft for turning therewith, said output entrainment means being fixedly connected to said output shaft and having a longitudinally extending slot to receive said arm of said input entrainment means arranged within said slot with lateral clearance at each side of said arm, said looped spring means including outwardly bent ends extending into said clearances respectively, said output entrainment means having a traversly extending slot and spring elements arranged in said traversally extending slot, said input entrainment means being provided with a nose projecting into said traversally extending slot between said spring elements so that the two entrainment means are turned relative to each other only against the force of said spring elements.

2. A combination as defined in claim 1, wherein said looped spring means engages said peripheral surface with slight pretension.

3. A combination as defined in claim 1, wherein at least said peripheral surface is made from wear resistant material.

4. A combination as defined in claim 1, wherein said friction core projects with one end beyond said output entrainment means and being provided at said projecting end with a radially outwardly extending flange carrying a gearing, and a gear transmission between said reversible electromotor and said gearing.

5. A combination as defined in claim 1, further comprising a rotation reversing switch having a yoke operatively connected to said hollow shaft to be turned by the latter and energizing said electromotor for rotation in one or the opposite direction immediately upon turning of said hollow shaft.

6. A combination as defined in claim 1, further comprising antifriction bearings mounting said friction core on said hollow shaft.

7. A combination as defined in claim 6, wherein said antifriction bearings are needle bearings.

8. A combination as defined in claim 1, and including sleeve bearings mounting said friction core on said hollow shaft.

9. A combination as defined in claim 1, wherein said outwardly bent ends of said looped spring means are spaced in a neutral position of the latter a smaller distance from said input entrainment means than from said output entrainment means.

10. A combination as defined in claim 1, wherein said spring elements engage said nose with pretension.

11. A combination as defined in claim 1, wherein said spring elements are formed from elastic, rubber-like material.

12. A combination as defined in claim 1, wherein said spring elements are formed from spring steel.

13. A combination as defined in claim 1, wherein said looped spring means comprises a plurality of springs, each having the same length and the same diameter, said plurality of springs extend parallel to each other about the peripheral surface of said friction core.

14. A combination as defined in claim 13, wherein said arm has at least one edge extending inclined to the longitudinal axis thereof so that the ends of said plurality of springs engage, during the transition from a coupling position tightly to a slipping position, one after another toward said inclined edge to uncouple thereby.

15. A combination as defined in claim 1, wherein said arm constituting said input entrainment means has on opposite longitudinal edges thereof radially inwardly projecting beads reaching nearly to the peripheral surface of the friction core.

16. A combination as defined in claim 1, wherein said looped spring means is formed from flat wire coiled on edge about the peripheral surface of said friction core.

* * * * *